(12) United States Patent
Ur

(10) Patent No.: US 6,249,283 B1
(45) Date of Patent: Jun. 19, 2001

(54) USING OCR TO ENTER GRAPHICS AS TEXT INTO A CLIPBOARD

(75) Inventor: Shmuel Ur, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/056,341

(22) Filed: Apr. 7, 1998

(30) Foreign Application Priority Data

Jul. 15, 1997 (EP) .................................................. 97480043

(51) Int. Cl.$^7$ ....................................................... G06F 3/00
(52) U.S. Cl. .................... 345/339; 345/326; 345/346; 382/182; 382/187; 707/539; 707/541
(58) Field of Search ...................................... 345/345, 346, 345/339; 382/187, 189, 182; 707/531, 539, 530, 541

(56) References Cited

U.S. PATENT DOCUMENTS

| | | | | |
|---|---|---|---|---|
| 5,386,564 | * | 1/1995 | Shearer et al. ........................ | 707/101 |
| 5,621,878 | * | 4/1997 | Owens et al. ......................... | 345/326 |
| 5,659,791 | * | 8/1997 | Nakajima et al. .................... | 707/539 |
| 5,850,480 | * | 12/1998 | Scanlon ................................ | 382/229 |
| 5,881,381 | * | 3/1999 | Yamashita et al. ................... | 707/509 |
| 5,889,518 | * | 3/1999 | Poreh et al. .......................... | 345/340 |

* cited by examiner

Primary Examiner—Raymond J. Bayerl
Assistant Examiner—Cuong T. Thai
(74) Attorney, Agent, or Firm—Robert Tassinari, Jr.

(57) ABSTRACT

A computer system is provided for transferring graphical textual information into an application program. The arrangement comprises an information transfer means, activated in response to a user action on an input device of the computer system, for identifying on the computer display screen a user selected source of textual information, and transferring said textual information as a bit image into a first predetermined location of the computer memory. The arrangement using optical character recognition logic (OCR) coupled to the information transfer means, for generating a character code for each character image identified in the image stored in the first memory location. The generated character codes are stored by said information transfer means into a second predetermined location of the computer memory. The source information is available to this second location to be inserted into a destination application program by being pasted into a user defined screen location.

25 Claims, 2 Drawing Sheets

USING OCR TO ENTER GRAPHICS AS TEXT INTO A CLIPBOARD

TECHNICAL FIELD

The present invention relates to information processing systems such as personal computers or workstations and more particularly to a system for transferring any type of displayed data, from one application program to another application program.

BACKGROUND ART

A very common feature within application programs such as word-processors or text editors within graphical user interfaces (GUI) such as window-based environments, is the ability for the user to use functions that allow to transfer text or characters in general from one place to another. Examples of such functions are the well-known cut-and-paste or copy-and-paste functions. These functions basically use a buffer memory (often referred to as a clipboard) for storing the text or characters that are to be copied or transferred from one place to another within the same application program or to another application program when feasible. The common way for selecting a portion of a screen to be copied or moved, is to use a selecting device such as a mouse that the user drags over the portion of the screen being selected while pressing one of the mouse's button. When the desired portion of the screen is selected, normally that portion is highlighted, then, the user moves the mouse to the screen location where the selected portion is to be transferred and presses another mouse button for achieving the transfer. While the mouse is the most common selecting device used, in some applications the selection is done using the keyboard (e.g. the VI editor in UNIX environment).

With some applications e.g. some text editors, the user is provided with cut-and-paste or copy-and-paste functions that work only within the same application but not for transferring data to another application. Generally, this happens when the application uses its own clipboard, which is distinct from the operating system's clipboard.

In some other applications such as graphics/image display applications (such as applications accessed through the Internet network), the user is generally not provided with any such functions. If this is the case, the user will have to print the screen or manually copy the text that he wants to keep a record of. Considering the important development of graphical applications e.g. within the Internet network whereby the user may want to store or catch information, it would be very useful for the user to be provided with a system that would offer the capability of a copy/cut-and-paste function that is usable in any window-based application, that displays text or graphics, for transferring portions of screen into a file or to another portion of the screen within or not the same application.

SUMMARY OF THE INVENTION

The object of the present invention is to provide a system for moving a displayed text from application to application when support is not provided and more particularly when the displayed text is issued from a graphic application.

According to the invention this object is achieved in a computer system including operating system with a graphical user interface responsive to a user input device by having: an information transfer means, activated in response to a user action on the input device, for identifying a user selected source of textual information, and for transferring textual information from the selected source as an image into a first predetermined location of the computer system's memory; and an optical character recognition logic (OCR) coupled to the information transfer means, for generating a character code for each character image identified in said image stored in the first predetermined location, the generated character codes being stored afterwards by the information transfer means into a second predetermined location of the computer memory whereby said source information is rendered available to an application program by being inserted into a user defined screen location.

Preferably the arrangement for transferring information into an application program is implemented by an application software program.

Viewed from another aspect, the present invention provides a method for transferring information into an application program of a computer system, the method comprising: identifying a portion of the display screen, the portion being selected by a user action on an input device, and storing said selected portion of the screen as a bit image into a first predefined location of the memory; detecting character images in the stored bit image and generating a coded representation of a character sequence from the detected character images, the detection and generation substeps being carried out by an optical character recognition logic, and storing the coded representation of a character sequence into a second predetermined location of the computer memory; and inserting the coded representation of a character sequence into a user selected location of the display screen by a user action on the input device, the location being operated by an application program.

BRIEF DESCRIPTION OF THE DRAWINGS

An embodiment of the invention will now be described, by way of example only, with reference to the accompanying drawings, wherein.

DETAILED DESCRIPTION OF THE INVENTION

Figure 1:
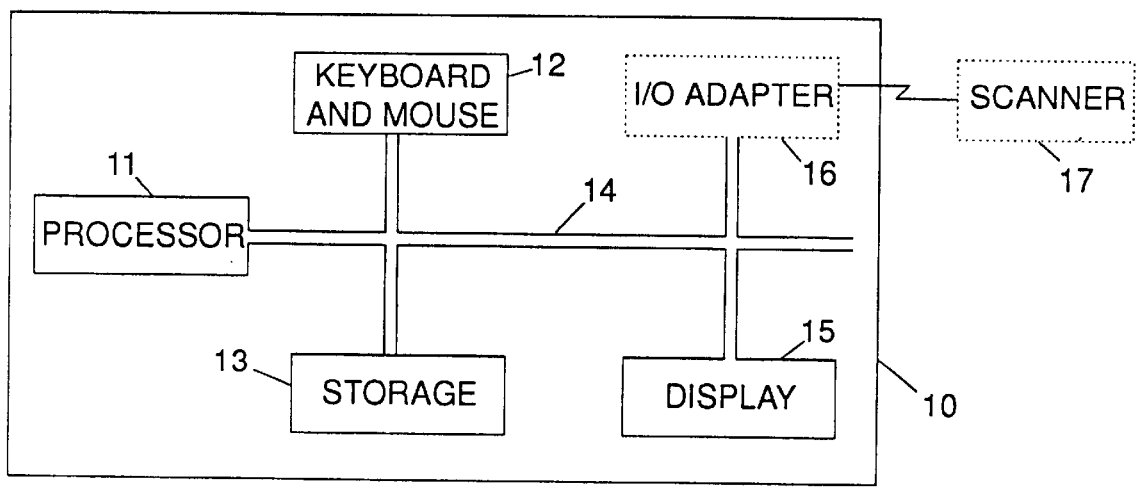
FIG. 1 is a schematic view of the apparatus used in the embodiment.

The computer system of the preferred embodiment of the invention is shown generally in FIG. 1. The computer system 10 comprises a processor 11, which is connected via bus 14 to storage memory 13, cathode ray tube display device 15, user input devices—keyboard and mouse—shown generally at 12. Storage memory 13 includes a disk storage device and a RAM (random access memory). Optionally (as illustrated with dotted lines), Processor 11 is connected via bus 14 and input/output adapter 16 to a scanning device 17.

Figure 2:
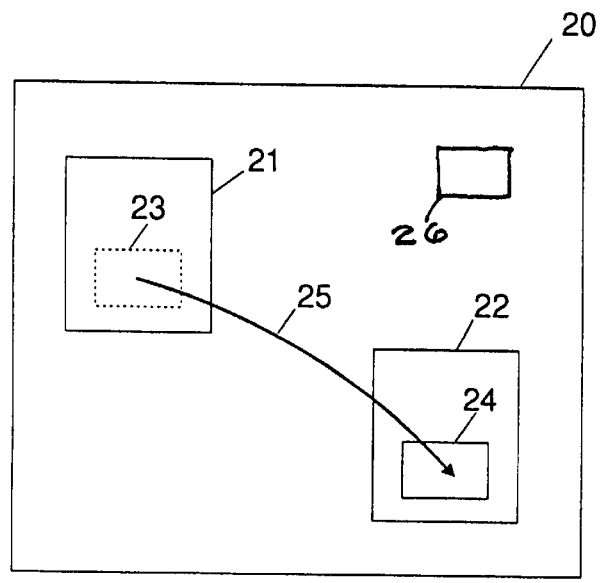
FIG. 2 shows a plan view illustrating one example of the display screen displaying a source window and a destination window in a multiple window environment.

FIG. 2 illustrates an example of particular windows displayed on the display screen 20 of the display unit 15 of the computer system 10 shown in FIG. 1. The windows displayed are enabled by a window-based graphical user interface (GUI). Window 21 displays an image containing textual data which, for example, has been downloaded from a server machine accessed via the Internet network. Window 22 displays data related to an application program, and wherein the user wants to transfer textual data from window 21. In that purpose, the user selects a portion of the first window 21 for example by dragging over the mouse while pressing its left button. When the button is released the portion of the screen 23 is captured. Then an optical character recognition (OCR) process is applied to the data captured inside portion 23 and its result is then transferred, as illustrated by arrow 25, into a destination location 24 of the second window 22. In the preferred embodiment the user selects the destination location with the mouse and data is pasted when clicking the right mouse button.

Figure 3:
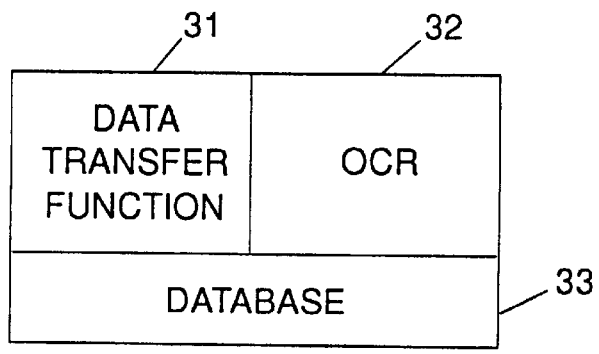
FIG. 3 is a schematic diagram of the software elements used.

In the preferred embodiment, the invention is implemented as an application program (referred to as Information Transfer Application or ITA program) which is stored in the disk storage device 13 of the computer system 10. FIG. 3 is a schematic diagram showing the software elements used in this program. The ITA program comprises three software elements: a data transfer function (herein also referred to as DTF) 31, an optical character recognition (OCR) logic 32, a database 33. The data transfer function 31 is responsible for transferring a user selected portion of an image as explained hereinabove into a first predefined file or memory location into database 33. The DTF reads directly the screen buffer and extracts a bit images that corresponds to the portion of the screen delimited by the dragging operation of the mouse. Then, an optical character recognition (OCR) logic 32 is automatically applied to the first file in database 33 in order to extract the character information from the stored bit image, and translating the extracted characters into a coded form such as ASCII. Then, encoded characters are passed to DTF 31 which stores them into a second predefined file or memory location in database 33. Database 33 is constituted for example by a set of files that is required by the software application program implementing the present invention, and which is located in the disk storage device 13.

In the preferred embodiment the second predefined file where the coded image of the first window screen location is stored, is the operating system (OS) clipboard i.e. a special memory resource maintained by the OS and used for cut/copy-and-paste operations. In another embodiment, the second predefined file is specific to the application program implementing the invention.

Figure 4:
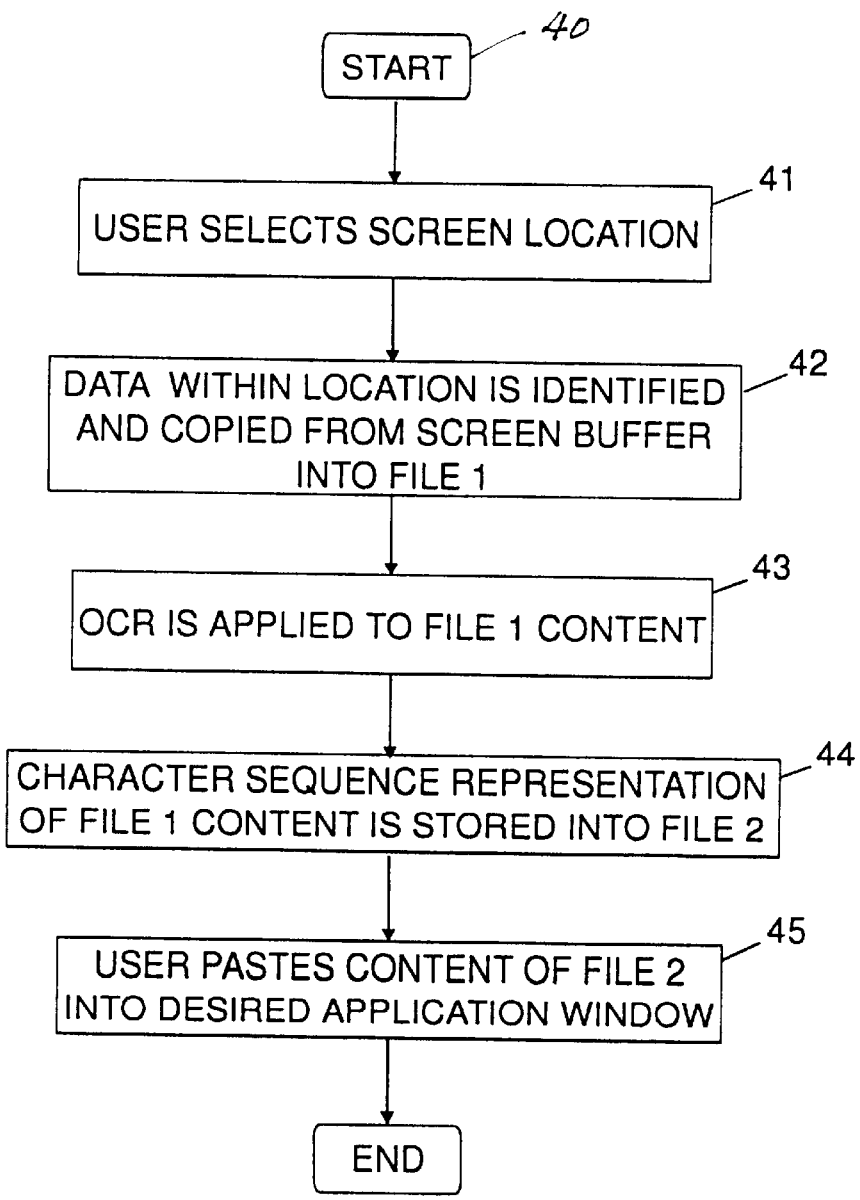
FIG. 4 is a flow chart showing the sequence of operations.

FIG. 4 is a flow chart showing the sequence of operations. In step 41 the user selects a screen location to be copied into a destination application window. In order to select the screen location, the user can use a mouse device in the manner described above, but he can also use the keyboard by pressing a predefined combination of keys. As shown in step 42, when the area to be copied is selected, the present claimed information transfer system identifies the data displayed within the selected area and takes the corresponding bitmap from the screen buffer and copies it into a first file referred to as "FILE 1". While a file has been used in this embodiment, a location in the RAM (random access memory) of the computer system could alternatively be used. In step 43 an optical character recognition logic (OCR) is applied to the content of "FILE 1" that is, the bit image of the user selected location of the screen. OCR logic extracts character images from the bitmap and translates each character identified into a coded form such as ASCII. The resulting coded characters sequence is then stored as shown in step 44 into a second predetermined memory location which can also be either a file "FILE 2", or a RAM memory location. More particularly as said above in the description of FIG. 3, the second memory location can be the operating system's clipboard itself. In step 45 the user pastes the content of "FILE 2" into the desired application window, e.g. into a word processing application window. This is now possible because "FILE 2" contains characters in coded—e.g. ASCII—form.

Activation of the Information Transfer Application Program

The ITA program is activated by clicking a mouse button on a dedicated icon 26 displayed on the screen 20 in FIG. 2. When the user clicks on the icon, the next time he drags the mouse on a portion of the screen, the content of the resulting defined screen area is caught and the sequence operations of FIG. 4 are applied. Alternatively, in another embodiment, there is no icon displayed and the ITA program is activated by pressing a specific combination of the mouse buttons, e.g. pressing simultaneously two buttons. In still another embodiment, the ITA program is automatically activated when the user tries to cut/copy-and-paste displayed data which is not supported by the operating system's clipboard, i.e. graphics data.

Referring back to FIG. 1, processor 11 can additionally be connected to a scanning device 17 via bus 14 and I/O adapter 16. In this configuration, document pages placed in scanning device 17 are digitized, and digitized images are passed via processor 11 to the Information Transfer Application program stored in disk memory 13. ITA program is automatically activated and digitized images are processed as if they had been selected with the mouse on the display screen. After OCR processing on these images, the user is provided with the ability of pasting textual information extracted from the scanned documents in a desired application window.

Software Implementation of ITA Program

In the preferred embodiment the data transfer function 31 of FIG. 3—i.e. the software part that performs data recognition from the screen area selected by the user selecting device, transmits the data as a bit image to the OCR part 32, and after OCR processing stores characters codes into a specific memory location ("FILE 2") or into the operating system's clipboard—is implemented using Java computing language from Sun Microsystems. Java language provides a platform-independent environment. Another way is to have the OCR logic implemented using a regular language such as C language, which allows to optimize the performance of the OCR logic which is reputed to be "CPU time" consuming. OCR functions are available for most operating systems. Thus, with this implementation, the porting operation required for porting the present ITA program from one computing platform to another will be minimized and limited to the OCR logic. Alternatively, all the ITA program functions can be implemented using Java language. With this implementation, the OCR function would not be optimized in terms of performance. But with the ITA program being platform independent, no porting operation would be required. Furthermore, for distribution purpose, the whole application program package could be available for downloading from a server in a telecommunication network such as the well-known Internet network.

It can thus be seen that the invention provides the user with a system for copying text from graphical applications or text applications that do not support the operating system clipboard, to text applications, with a simplicity of use as it would result in using the common clipboard facility provided by an operating system. Furthermore, the system of the invention can interface with any graphical application and may be ported to any computer platform.

While the invention has been described in terms of a single preferred embodiment, those skilled in the art will recognize that the invention can be practiced with modifications without departing from the spirit and scope of the appended claims.

What is claimed is:

1. A computer system including a processor, a display screen coupled to a user input device, a memory and an operating system with a graphical user interface responsive to the user input device, the system being characterized by apparatus for transferring information comprising:

source information transfer software, which in response to a user action on said input device identifying a user selected source of textual data information of character images on the display screen, always stores said textual data information as a bit image of each character image into a first predetermined location of the computer system memory; and optical character recognition logic which, without user activation and irrespective of whether or not character codes for the user selected source of the textual information is already stored in the computer system, always automatically generates a character code for each character image identified in said textual data stored in said first predetermined location by said information transfer software; and character information transfer software which automatically places the character codes as they are generated into a second predetermined location of the computer memory where said textual data information is rendered available as the generated character codes to a destination application program by being inserted into a user defined screen location operated by the destination application program.

2. A computer system as claimed in claim 1, wherein said second predetermined location of the computer memory is a clipboard area in memory provided by said operating system for storing information, said operating system being responsive to a predefined user input action for inserting information, stored in the clipboard areas, into the user defined screen location being operated by the destination application program.

3. A computer system as claimed in claim 1, wherein the source of information in the user selected portion of the display screen is in an area that is operated by a source application program other than the destination application program, and the source and destination application programs have incompatible data formats and the generated character codes for the character images are ASCII format character codes.

4. A computer system as claimed in claim 3, wherein said source information transfer software is user activated without dragging the icon with the mouse by clicking a mouse device button on a preexisting icon displayed on the display screen.

5. A computer system as claimed in claim 4, wherein said portion of the display screen is selected by said source information transfer software responsive to a predefined user action of dragging a mouse device across to the user selected portion of the display screen after the source information transfer software has been user activated.

6. A computer system as claimed in claim 5, wherein said destination application program includes said source information transfer software.

7. A computer system as claimed in claim 3 wherein said portion of the display screen is selected by means responsive to a user action of pressing a predefined combination of keys from a keyboard connected to the computer system processor.

8. A computer system as claimed in claim 3, wherein the software for transferring information into an application program is in the destination application software program.

9. A computer system as claimed in claim 8, wherein said information transfer software is in Java computer language and wherein said optical character recognition logic (OCR) is in another computer language.

10. A computer system as claimed in claim 8, wherein the software for transferring information into the destination application program is coded in Java computer language.

11. A computer system as claimed in claim 1, wherein the selected source of textual information is the output of a scanner device connected to said processor of the computer system.

12. A computer system as claimed in claim 1, wherein said second location of the computer memory is an area in memory provided by the destination application program for storing information, said area being responsive to a predefined user input action for inserting information stored in said area into a user defined screen location, said screen location being operated by the destination application program.

13. A method of transferring information into an application program of a computer system including at least a processor, a display screen coupled to a user input device, a memory and an operating system with a graphical user interface responsive to the user input device, wherein the method comprises the following steps:

a) identifying data in a portion of the display screen selected by a user action on the input device, and in response to said user action storing in a first predefined location of the memory a bit image of the data in said selected portion of the screen;

b) automatically generating an ASCII coded representation of a character sequence from detected character images of the data in response to said computer system's detection of the bit image in the first predefined location of memory, and storing said ASCII coded representation of a character sequence into a second predetermined location of the computer memory; and c) inserting said ASCII coded representation of a character sequence into a destination application program by said user selecting a location of the display screen by a user action on the input device, said location being operated by said destination application program.

14. The method of claim 13, wherein the portion of the display screen is in an area of the display screen that is operated by a source application program other than the destination application program and the source and destination application programs have incompatible data formats.

15. A computer system as claimed in claim 13, wherein the source of information in the user selected portion of the display screen is in an area that is operated by a source application program other than the destination application program, and the source and destination application programs have incompatible data formats.

16. A computer program on a computer readable medium for a computer system which includes a processor, a display screen coupled to a user input device, a memory and an operating system with a graphical user interface responsive to the user input device, the computer program being characterized by:

information transfer software, activated in response to a user action on said input device, for identifying a user selected source of textual data information in character image form, and transferring all said textual data information from said selected source as a bit image of each character image into a first predetermined location of the computer system memory; and optical character recognition logic software for automatically generating, irrespective of whether or not character codes for the user selected source of textual data information is already stored in the computer system, a character code for each character image identified in the image stored in said first predetermined location in response to the placement of the bit information into the first predetermined location by said information transfer software, said generated character codes being stored then by said information transfer software into a second predetermined location of the computer memory where said textual data information is rendered available as character codes to a destination application program.

17. The computer program as claimed in claim 16, wherein said second location of the computer memory is an area in memory provided by said computer program for storing information as character codes in ASCII form, said computer program being responsive to a predefined user input action for inserting the information in said area into a user defined screen location, said screen location being operated by the destination application program.

18. The computer software as claimed in claim 16, wherein said source information transfer software is user activated by clicking a mouse device button on a preexisting icon displayed on the display screen.

19. The computer software as claimed in claim 18, wherein the source of information is a user selected portion of the display screen in an area that is operated by a source application program other than the destination application program, and the source and destination application programs have incompatible data formats and said character images are stored in the second predetermined location in ASCII character code form.

20. A computer system as claimed in claim 19, wherein said portion of the display screen is selected by means responsive to a user action of dragging a mouse from said portion of said screen to a second portion of the control screen under the control of the destination application program.

21. The computer program of claim 20, wherein the destination application program includes the source information transfer software.

22. A computer program on a computer usable media for transferring information into an application program of a computer system including at least a processor, a display screen coupled to a user input device, a memory and an operating system with a graphical user interface responsive to the user input device, the computer program comprising:

a) source information transfer software, for storing a portion of the screen as a bit image into a first predefined storage location when activated by a user action on said input drive selecting that portion of the display screen;

b) optical character recognition software for automatically generating an ASCII coded representation of a character sequence from detected character images in response to said computer system's detection of the bit image in the first predefined location of memory irrespective of whether or not character codes of the character images are already stored in a storage location of the computer system, and storing said ASCII coded representation of a character sequence into a second predetermined storage location of the computer memory; and c) insertion software for inserting said ASCII coded representation of a character sequence into a destination application program upon the user selecting, with a user action on the input device, a location of the display screen being operated by a destination application program.

23. The computer program as claimed in claim 22, wherein said second location of the computer memory is an area in memory provided by the destination application program for storing information, said area being responsive to a predefined user input action for inserting information stored in said area into a user defined screen location, said screen location being operated by the destination application program.

24. The computer program as claimed in claim 22, wherein the source of information in the user selected portion of the display screen is in an area that is operated by a source application program other than the destination application program, and the source and destination application program have incompatible data formats.

25. The computer program as claimed in claim 24 including software.

* * * * *